US008742769B2

(12) United States Patent
Sheikman et al.

(10) Patent No.: US 8,742,769 B2
(45) Date of Patent: Jun. 3, 2014

(54) SENSOR PROBE AND METHODS OF ASSEMBLING SAME (75) Inventors: Boris Leonid Sheikman, Minden, NV (US); Yongjae Lee, Niskayuna, NY (US)

(73) Assignee: General Electric Company, Schenectady, NY (US)

( * ) Notice: Subject to any disclaimer, the term of this patent is extended or adjusted under 35 U.S.C. 154(b) by 675 days.

(21) Appl. No.: 13/010,026

(22) Filed: Jan. 20, 2011

(65) Prior Publication Data
US 2012/0187960 A1   Jul. 26, 2012

(51) Int. Cl.
*G01R 27/32* (2006.01)

(52) U.S. Cl.
USPC ......................................... 324/642

(58) Field of Classification Search
USPC .................. 324/637–644; 342/458
See application file for complete search history.

(56) References Cited

U.S. PATENT DOCUMENTS

| 4,900,985 | A | 2/1990 | Tashiro et al. |
| 5,416,487 | A | 5/1995 | Hampson |
| 5,583,523 | A | 12/1996 | Wallace, Jr. |
| 6,778,132 | B2 | 8/2004 | Palata |
| 7,190,175 | B1 | 3/2007 | Kelly et al. |
| 7,256,376 | B2 | 8/2007 | Tsuji |
| 2007/0024505 | A1* | 2/2007 | Geisheimer et al. ... 343/700 MS |
| 2008/0020488 | A1* | 1/2008 | Clevenger et al. ................ 438/3 |
| 2008/0044186 | A1* | 2/2008 | George et al. ................ 398/115 |
| 2008/0062044 | A1* | 3/2008 | Al-Mahdawi .......... 343/700 MS |
| 2010/0061421 | A1 | 3/2010 | Van De Velde et al. |

FOREIGN PATENT DOCUMENTS

EP    0806680 A2    11/1997

OTHER PUBLICATIONS

EP Search Report and Written Opinion from Application No. 12151310.5 dated Apr. 27, 2012.

* cited by examiner

*Primary Examiner* — Melissa Koval
*Assistant Examiner* — Daniel Miller
(74) *Attorney, Agent, or Firm* — Fletcher Yoder P.C.

(57) ABSTRACT

A method of assembling a sensor probe for use in a sensor assembly is provided. The method includes providing an emitter configured to generate at least one forward propagating electromagnetic field from at least one microwave signal and to generate at least one backward propagating electromagnetic field. A data conduit is coupled to the emitter. Moreover, a ground conductor is extended substantially circumferentially about the data conduit. The ground conductor is configured to substantially reduce electromagnetic radiation within the sensor assembly.

20 Claims, 4 Drawing Sheets

SENSOR PROBE AND METHODS OF ASSEMBLING SAME

BACKGROUND OF THE INVENTION

The embodiments described herein relate generally to power systems and, more particularly, to a sensor probe for use in a sensor assembly and methods of assembling the sensor probe.

At least some known power generation systems include at least one component that may become damaged or worn over time. For example, at least some known power generation systems include machines, such as turbines, that include components such as, bearings, gears, and/or rotor blades that wear over time. Continued operation with a worn component may cause additional damage to other components or may lead to a premature failure of the component or system.

To detect component damage within machines, the operation of at least some known machines is monitored with a monitoring system. At least some known monitoring systems use sensor assemblies that may include proximity sensors and/or sensor probes that use microwave emitters to measure a vibration and/or a relative position of a machine component. More specifically, within at least some known sensor probes, an emitter is used to generate at least one forward propagating electromagnetic field from at least one microwave signal. The machine component may be measured and/or monitored when the machine component interacts with the forward propagating electromagnetic field. More specifically, a loading is induced to the emitter by the interaction between the component and the forward propagating electromagnetic field. Within such systems, the sensor probe is coupled via a data conduit to a signal processing device that generates a proximity measurement based on the loading induced to the emitter.

While such sensor assemblies are generally able to provide fairly accurate proximity measurements, the conduit connecting various components of the sensor assembly may emit small amounts of electromagnetic radiation. For example, the emitter generates at least one backward propagating electromagnetic field. As such, electromagnetic radiation is emitted from the emitter, and thus, the sensor assembly emits electromagnetic radiation as a result of extraneous currents that are channeled through the assembly. When impedance levels vary between the emitter, the data conduit, and the signal processing device, at least one common mode current is generated and channeled between the components. Moreover, the variance in the impedance levels of the components results in an electromagnetic potential that is transmitted to the conduit causing the conduit to radiate electromagnetic waves. Emitting such electromagnetic radiation within the sensor assembly causes the energy within the sensor assembly to be substantially reduced which results in the signal strength generated by the emitter being reduced. The reduced signal strength adversely limits the accuracy of the sensor assembly.

BRIEF DESCRIPTION OF THE INVENTION

In one embodiment, a method of assembling a sensor probe for use in a sensor assembly is provided. The method includes providing an emitter configured to generate at least one forward propagating electromagnetic field from at least one microwave signal and to generate at least one backward propagating electromagnetic field. A data conduit is coupled to the emitter. Moreover, a ground conductor that extends substantially circumferentially about the data conduit is provided. The ground conductor is configured to substantially reduce electromagnetic radiation within the sensor assembly.

In another embodiment, a sensor probe for use in a sensor assembly is provided. The sensor probe includes an emitter that is configured to generate at least one forward propagating electromagnetic field from at least one microwave signal. The emitter is also configured to generate at least one backward propagating electromagnetic field. The sensor probe includes a data conduit that is coupled to the emitter. Moreover, the sensor probe includes a ground conductor that extends substantially circumferentially about the data conduit. The ground conductor is configured to substantially reduce electromagnetic radiation within the sensor assembly.

In yet another embodiment, a sensor assembly is provided. The sensor assembly includes at least one sensor probe that includes an emitter that is configured to generate at least one forward propagating electromagnetic field from at least one microwave signal. The emitter is also configured to generate at least one backward propagating electromagnetic field. The sensor probe includes a data conduit that is coupled to the emitter. Moreover, the sensor probe includes a ground conductor that extends substantially circumferentially about the data conduit. The ground conductor is configured to substantially reduce electromagnetic radiation within the sensor assembly. Moreover, the sensor assembly includes a signal processing device that is coupled to the sensor probe. The signal processing device is configured to generate a proximity measurement based on the loading induced to the emitter.

DETAILED DESCRIPTION OF THE INVENTION

The exemplary apparatus and methods described herein overcome at least some disadvantages associated with known sensor assemblies used in monitoring systems and/or components. In particular, the embodiments described herein provide a sensor assembly that includes a sensor probe that facilitates substantially reducing electromagnetic radiation within the sensor assembly such that signal strength is maintained. The sensor probe includes a ground conductor that extends substantially circumferentially about a data conduit coupled to an emitter. At least one backward propagating electromagnetic field generated by the emitter is reflected on the ground conductor to interact with a forward propagating electromagnetic field generated by the emitter. This interaction between the forward and backward propagating electromagnetic fields substantially reduces electromagnetic radiation within the sensor assembly. Moreover, the ground conductor also channels extraneous currents, such as common mode currents generated by the emitter and/or the data conduit, to ground, to facilitate reducing electromagnetic radiation within sensor assembly.

Figure 1:
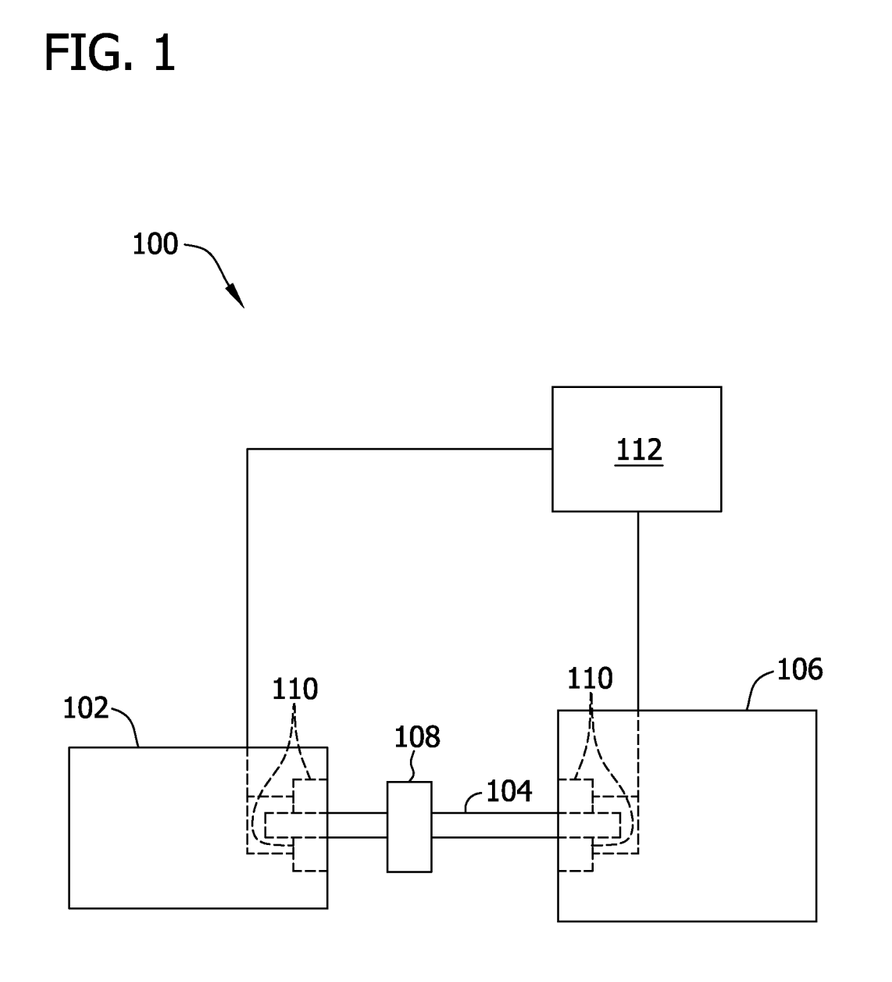
FIG. 1 is a block diagram of an exemplary power system.

FIG. 1 shows an exemplary power system 100 that includes a machine 102. In the exemplary embodiment, machine 102 may be, but is not limited to only being, a wind turbine, a hydroelectric turbine, a gas turbine, or a compressor. Alternatively, machine 102 may be any other machine used in a power system. In the exemplary embodiment, machine 102 rotates a drive shaft 104 coupled to a load 106, such as a generator.

In the exemplary embodiment, drive shaft 104 is at least partially supported by one or more bearings (not shown) housed within machine 102 and/or within load 106. Alternatively or in addition to, the bearings may be housed within a separate support structure 108, such as a gearbox, or within any other structure or component that enables power system 100 to function as described herein.

In the exemplary embodiment, power system 100 includes at least one sensor assembly 110 that measures and/or monitors at least one operating condition of machine 102, of drive shaft 104, of load 106, and/or of any other component of power system 100. More specifically, in the exemplary embodiment, sensor assembly 110 is a proximity sensor assembly 110 that is positioned in close proximity to drive shaft 104 for use in measuring and/or monitoring a distance (not shown in FIG. 1) defined between drive shaft 104 and sensor assembly 110. Alternatively, sensor assembly 110 may be any type of sensor assembly for measuring and/or monitoring any other parameter of machine 102 and that enables system 100 to function as described herein.

In the exemplary embodiment, sensor assembly 110 uses microwave signals to measure the proximity of a component of power system 100 with respect to sensor assembly 110. As used herein, the term "microwave" refers to a signal or a component that receives and/or transmits signals having one or more frequencies between about 300 megahertz (MHz) and about 300 gigahertz (GHz). Alternatively, sensor assembly 110 may measure and/or monitor any other component of power system 100, and/or may be any other sensor or transducer assembly that enables power system 100 to function as described herein. Moreover, in the exemplary embodiment, each sensor assembly 110 is positioned in any location within power system 100. Moreover, in the exemplary embodiment, at least one sensor assembly 110 is coupled to a diagnostic system 112 for use in processing and/or analyzing one or more signals generated by sensor assemblies 110.

During operation, in the exemplary embodiment, the operation of machine 102 may cause one or more components of power system 100, such as drive shaft 104, to change a relative position with respect to at least one sensor assembly 110. For example, vibrations may be induced to components and/or the components may expand or contract as an operating temperature within power system 100 changes. In the exemplary embodiment, sensor assemblies 110 measure and/or monitor the proximity, such as a static and/or vibration proximity, and/or the relative position of the components relative to each sensor assembly 110, and transmit a signal representative of the measured proximity and/or position of the components (hereinafter referred to as a "proximity measurement signal") to diagnostic system 112 for processing and/or analysis.

Figure 2:
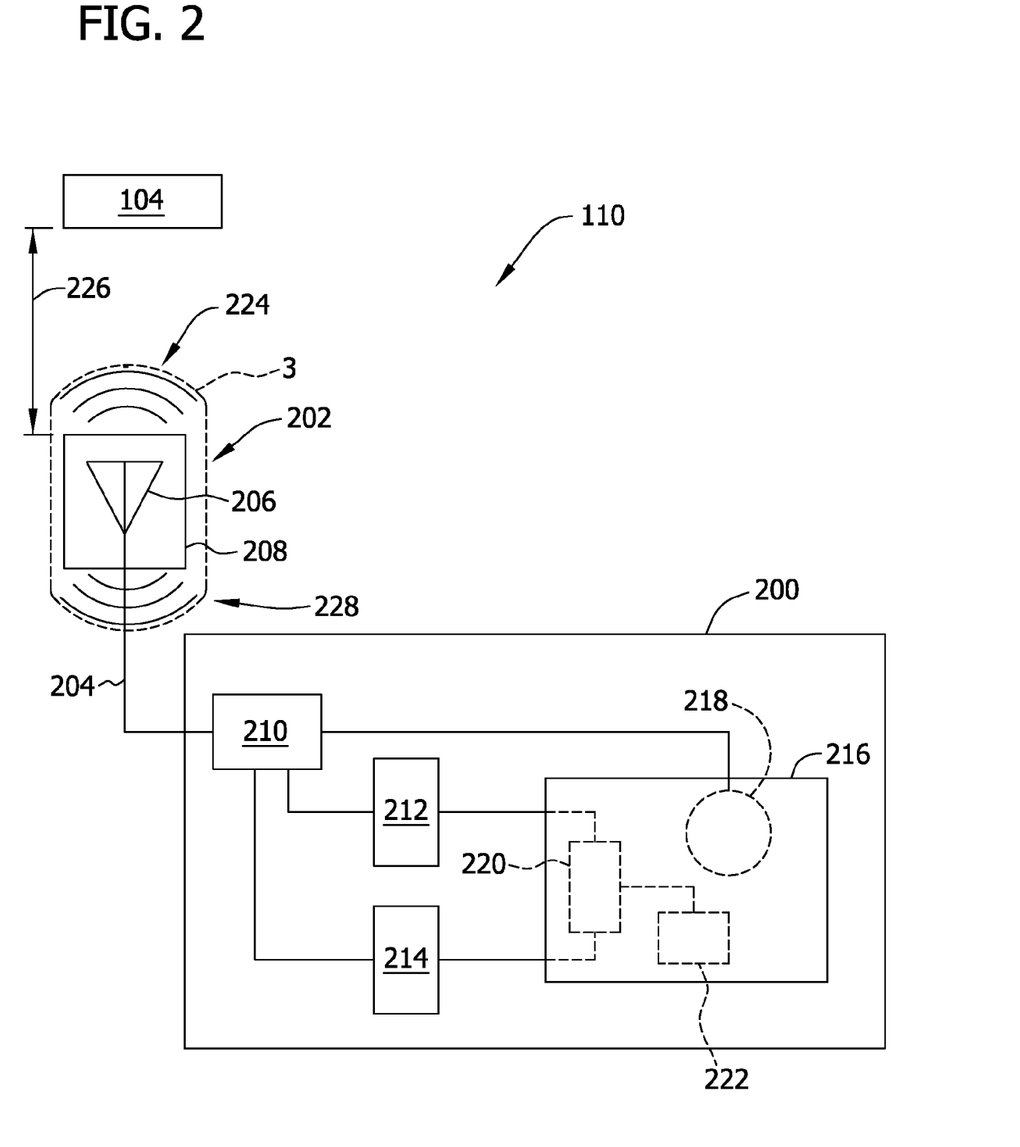
FIG. 2 is a block diagram of an exemplary sensor assembly that may be used with the power system shown in FIG. 1.

FIG. 2 is a schematic diagram of an exemplary sensor assembly 110 that may be used with power system 100 (shown in FIG. 1). In the exemplary embodiment, sensor assembly 110 includes a signal processing device 200 and a sensor probe 202 that is coupled to signal processing device 200 via a data or a signal conduit 204. Moreover, in the exemplary embodiment, probe 202 includes an emitter 206 that is coupled to and/or positioned within a probe housing 208. More specifically, in the exemplary embodiment, probe 202 is a microwave sensor probe 202 that includes a microwave emitter 206. As such, in the exemplary embodiment, emitter 206 has at least one resonant frequency that is within a microwave frequency range. More specifically, in the exemplary embodiment, emitter 206 is operating at a frequency of 3.3 GHz. Alternatively, emitter 206 may operate at any other frequency level that enables sensor assembly 110 and system 100 to function as described herein.

In the exemplary embodiment, signal processing device 200 includes a directional coupling device 210 coupled to a transmission power detector 212, to a reception power detector 214, and to a signal conditioning device 216. Moreover, in the exemplary embodiment, signal conditioning device 216 includes a signal generator 218, a subtractor 220, and a linearizer 222. Emitter 206 emits at least one forward propagating electromagnetic field 224 when a microwave signal is transmitted through emitter 206. Moreover, in the exemplary embodiment, emitter 206 emits at least one backward propagating electromagnetic field 228. Moreover, backward propagating electromagnetic field 228 may also be generated when forward propagating electromagnetic field 224 interacts with an object, such as a drive shaft 104 or another component of machine 102 (shown in FIG. 1) and/or of power system 100.

During operation, in the exemplary embodiment, signal generator 218 generates at least one electrical signal with a microwave frequency (hereinafter referred to as a "microwave signal") that is equal or approximately equal to the resonant frequency of emitter 206. Signal generator 218 transmits the microwave signal to directional coupling device 210. Directional coupling device 210 transmits the microwave signal to transmission power detector 212 and to emitter 206.

As the microwave signal is transmitted through emitter 206, forward propagating electromagnetic field 224 is emitted from emitter 206 and out of probe housing 208. If an object, such as a drive shaft 104 or another component of machine 102 (shown in FIG. 1) and/or of power system 100 enters and/or changes a relative position within forward propagating electromagnetic field 224, an electromagnetic coupling may occur between the object and field 224. More specifically, because of the presence of the object within electromagnetic field 224 and/or because of object movement, electromagnetic field 224 may be disrupted, for example, because of an induction and/or capacitive effect induced within the object, that may cause at least a portion of electromagnetic field 224 to be inductively and/or capacitively coupled to the object as an electrical current and/or charge. In such an instance, emitter 206 is detuned (i.e., a resonant frequency of emitter 206 is reduced and/or changed) and a loading is induced to emitter 206. The loading induced to emitter 206 causes a reflection of the microwave signal (hereinafter referred to as a "detuned loading signal") to be transmitted through data conduit 204 to directional coupling device 210.

Moreover, backward propagating electromagnetic field 228 is emitted from emitter 206 results in electromagnetic radiation (i.e., electromagnetic waves) being emitted from probe and within sensor assembly 110. Further, when loading is induced to emitter 206, emitter 206 has an impedance level that varies slightly from both data conduit 204 and signal processing device 200. Moreover, the impendence level of data conduit 204 varies slightly from the impedance level of signal processing device 200. More specifically, in the exemplary embodiment, the impedance level of emitter is approximately 50 Ohms, the impedance level of data conduit 204 is approximately 47 Ohms, and the impendence level of signal processing device 200 is approximately 49 Ohms. Alternatively, the impedance levels for emitter 206, data conduit 204 and signal processing device 200 may be any other level that enables assembly 110 and system 100 to function as described herein. As a result of the variation in impedance levels, extraneous currents are generated by emitter 206 and/or data conduit 204. More specifically, in the exemplary embodiment, the extraneous currents generated by emitter 206 and/or data conduit 204 include at least one common mode current. Moreover, in the exemplary embodiment, the detuned loading signal has a lower power amplitude and/or a different phase than the power amplitude and/or the phase of the microwave signal. Moreover, in the exemplary embodiment, the power amplitude of the detuned loading signal is dependent upon the proximity of the object to emitter 206. Directional coupling device 210 transmits the detuned loading signal to reception power detector 214.

In the exemplary embodiment, reception power detector 214 determines an amount of power based on, and/or contained within, the detuned loading signal and transmits a signal representative of the detuned loading signal power to signal conditioning device 216. Moreover, transmission power detector 212 determines an amount of power based on, and/or contained within, the microwave signal and transmits a signal representative of the microwave signal power to signal conditioning device 216. In the exemplary embodiment, subtractor 220 receives the microwave signal power and the detuned loading signal power, and calculates a difference between the microwave signal power and the detuned loading signal power.

Subtractor 220 transmits a signal representative of the calculated difference (hereinafter referred to as a "power difference signal") to linearizer 222. In the exemplary embodiment, an amplitude of the power difference signal is proportional, such as inversely or exponentially proportional, to a distance 226 defined between the object, such as a drive shaft 104 within electromagnetic field 224, and probe 202 and/or emitter 206 (i.e., distance 226 is known as the object proximity). Depending on the characteristics of emitter 206, such as, for example, the geometry of emitter 206, the amplitude of the power difference signal may at least partially exhibit a non-linear relationship with respect to the object proximity.

In the exemplary embodiment, linearizer 222 transforms the power difference signal into a voltage output signal (i.e., the "proximity measurement signal") that exhibits a substantially linear relationship between the object proximity and the amplitude of the signal. Moreover, in the exemplary embodiment, linearizer 222 transmits the proximity measurement signal to diagnostic system 112 (shown in FIG. 1) with a scale factor that is suitable for processing and/or analysis within diagnostic system 112. In the exemplary embodiment, the proximity measurement signal has a scale factor of volts per millimeter. Alternatively, the proximity measurement signal may have any other scale factor that enables diagnostic system 112 and/or power system 100 to function as described herein.

Figure 3:
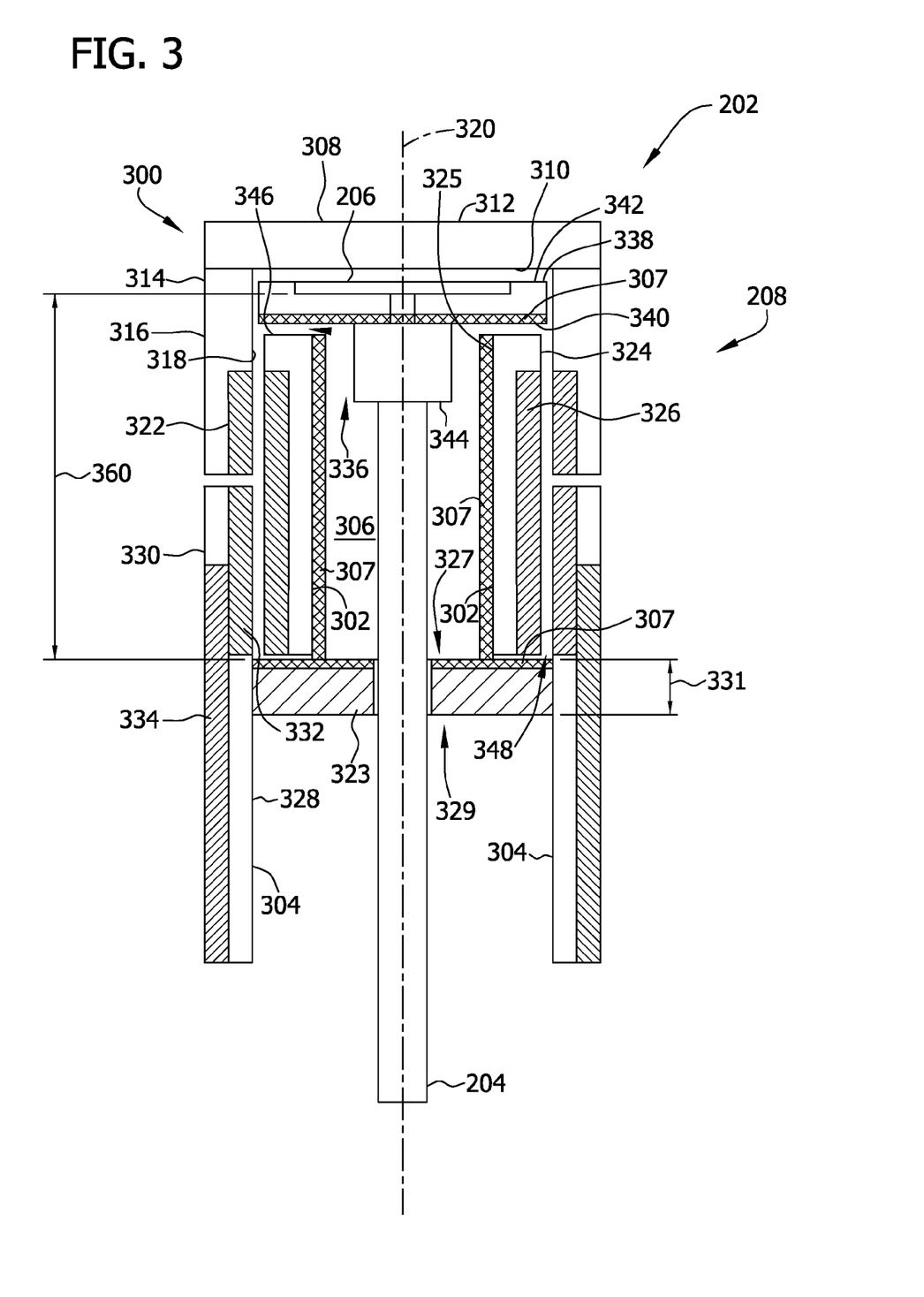
FIG. 3 is a cross-sectional view of an exemplary sensor probe that may be used with the sensor assembly shown in FIG. 2 and taken along area 3.

FIG. 3 is a cross-sectional view of probe 202 and probe housing 208 taken along area 3 (shown in FIG. 2). In the exemplary embodiment, probe housing 208 includes a probe cap 300, an inner sleeve 302, and an outer sleeve 304. A substantially cylindrical cavity 306 is at least partially defined by cap 300, inner sleeve 302, and outer sleeve 304. More specifically, probe cap 300, inner sleeve 302, and outer sleeve 304 are each substantially hollow, such that cavity 306 is at least partially defined by probe cap 300, inner sleeve 302, and outer sleeve 304 when probe housing 208 is assembled. Moreover, in the exemplary embodiment, an electromagnetic absorbent material 307 is applied into cavity 306. More specifically, in the exemplary embodiment, electromagnetic absorbent material 307 is applied across at least a portion of inner sleeve 302. In the exemplary embodiment, electromagnetic absorbent material 307 is applied to inner sleeve 302 via an adhesive. Alternatively, electromagnetic material absorbent material 302 may be applied to and/or impregnated onto inner sleeve 302 using any manner known in the art that enables probe 202 and/or sensor assembly 110 (shown in FIGS. 1 and 2) to function as described herein.

In the exemplary embodiment, probe cap 300 includes a substantially cylindrical end wall 308 that has an downstream surface 310 and an opposing upstream surface 312. Probe cap 300 also includes a substantially annular sidewall 314 that circumscribes downstream surface 310. Sidewall 314 includes an outer surface 316 and an opposing inner surface 318 that at least partially defines cavity 306. In the exemplary embodiment, probe cap 300 is substantially symmetric with respect to a centerline axis 320 extending through probe housing 208 when probe housing 208 is assembled. More specifically, sidewall 314 is spaced substantially equidistantly about centerline axis 320.

In the exemplary embodiment, probe cap 300 includes a threaded portion 322 that circumscribes inner surface 318. Probe cap 300, in the exemplary embodiment, is manufactured from a polyketone material, such as polyether ether ketone (PEEK), and/or any other thermoplastic material that enables probe cap 300 to be positioned within an industrial environment and/or within machine 102 without substantial degradation during operation of power system 100 (both shown in FIG. 1). Alternatively, probe cap 300 may be manufactured from any other material and/or compound that enables probe 202 to function as described herein.

In the exemplary embodiment, a ground conductor 323 is positioned within cavity 306 and positioned a distance 360 from emitter 206. In the exemplary embodiment, the position of ground conductor 323 is adjustable such that distance 360 may vary. Moreover, in the exemplary embodiment, ground conductor 323 is a substantially annular ground plane and is positioned between outer sleeve 304 and data conduit 204, within cavity 306 such that ground conductor 323 at least partially defines at least a portion of cavity 306. More specifically, outer sleeve 304 is positioned about ground conductor 323, and ground conductor 323 is positioned about data conduit 204. Moreover, in the exemplary embodiment, ground conductor 323 extends substantially circumferentially about data conduit 204. In the exemplary embodiment, ground conductor 323 is coupled to a conductive material or element (not shown) within outer sleeve 304 and/or within data conduit 204 that enables current to be transmitted from ground conductor 323 to ground. Ground conductor 323, in the exemplary embodiment, is manufactured from any metallic material that enables ground conductor 323 to absorb current and transmit the current to ground.

Moreover, in the exemplary embodiment, ground conductor 323 includes an upstream surface 327 and a downstream surface 329 that is spaced a predetermined distance 331 from upstream surface 327. In the exemplary embodiment, distance 331 is less than approximately 0.10 inches. Alternatively, distance 331 may be selected to be any length that enables probe 202 and/or assembly 110 to function as described herein. Moreover, in the exemplary embodiment, electromagnetic absorbent material 307 is applied across ground conductor 323. In the exemplary embodiment, electromagnetic absorbent material 307 is applied to ground conductor 323 via an adhesive. Alternatively, electromagnetic material absorbent material 307 may be applied to and/or impregnated onto ground conductor 323 using any manner known in the art that enables probe 202 and/or assembly 110 to function as described herein. Moreover, in some embodiments, ground conductor 323 may be coupled to probe outer sleeve 304 and/or to data conduit 204 via welding, brazing, and/or via a threaded coupling. Alternatively, ground conductor 323 may be formed integrally with sleeve 304 and/or conduit 204.

In the exemplary embodiment, inner sleeve 302 is annular and is sized to be at least partially received within probe cap 300. Inner sleeve 302 includes an outer surface 324 and an opposing inner surface 325. In the exemplary embodiment, inner sleeve 302 includes a threaded portion 326 that circumscribes outer surface 324. Threaded portion 326 cooperates with probe cap threaded portion 322 to enable probe cap 300 and inner sleeve 302 to threadably couple together. In the exemplary embodiment, inner sleeve 302 is manufactured from a substantially non-conductive material, such as a thermoplastic material or any other plastic material. As such, inner sleeve 302 facilitates electromagnetically isolating emitter 206 from outer sleeve 304 and/or from any portion of machine 102 that is adjacent to probe 202. Alternatively, inner sleeve 302 may be manufactured from any material and/or compound that enables probe 202 to function as described herein.

Outer sleeve 304, in the exemplary embodiment, is annular and is sized to at least partially receive inner sleeve 302 therein. Outer sleeve 304 includes an inner surface 328 and an opposing outer surface 330. In the exemplary embodiment, outer sleeve 304 includes an inner threaded portion 332 that circumscribes inner surface 328, and an outer threaded portion 334 that circumscribes outer surface 330. Inner threaded portion 332 cooperates with inner sleeve threaded portion 326 to enable inner sleeve 302 to be threadably coupled at least partially within outer sleeve 304. Outer threaded portion 334 is sized and shaped to cooperate with a threaded bore (not shown) formed within a machine, such as machine 102. As such, when probe 202 is assembled, probe 202 may be threadably coupled within machine 102, such that probe 202 is positioned proximate to a machine component to be measured and/or monitored. Alternatively, outer sleeve 304 may be fabricated substantially smoothly and/or may not include outer threaded portion 334 such that probe 202 and/or outer sleeve 304 may be coupled to machine 102 via one or more bolts, brackets, and/or any other coupling mechanism that enables power system 100 (shown in FIG. 1) to function as described herein. Moreover, in the exemplary embodiment, ground conductor 323 is coupled to inner surface 328.

In the exemplary embodiment, an emitter assembly 336 is positioned within probe housing 208 to form probe 202. More specifically, in the exemplary embodiment, within emitter assembly 336, emitter 206 is coupled to an emitter body 338. Emitter body 338 includes downstream surface 340 and an opposing upstream surface 342. In the exemplary embodiment, emitter body 338 is a substantially planar printed circuit board (PCB), and emitter 206 includes one or more traces and/or other conduits (not shown) that are formed integrally with, and/or coupled to, emitter body downstream surface 340. Alternatively, emitter 206 and/or emitter body 338 may have any other construction and/or configuration that enables probe 202 to function as described herein. Moreover, in the exemplary embodiment, electromagnetic absorbent material 307 is applied across emitter body 338. More specifically, electromagnetic absorbent material 307 is applied across emitter body downstream surface 340. In the exemplary embodiment, electromagnetic absorbent material 307 is applied to emitter body downstream surface 340 via an adhesive. Alternatively, electromagnetic material absorbent material 307 may be applied to and/or impregnated onto emitter body downstream surface 340 using any manner known in the art that enables probe 202 and/or assembly 110 to function as described herein.

A coupling device 344 couples emitter body 338 and emitter 206 to a data or a signal conduit, such as to data conduit 204 for use in transmitting and receiving signals to and from signal processing device 200 (shown in FIG. 2). In the exemplary embodiment, coupling device 344 includes one or more bolts, brackets, welds, and/or any other coupling mechanism that enables emitter assembly 336 to function as described herein. Alternatively, data conduit 204 may be formed integrally with emitter 206, emitter body 338, and/or signal processing device 200.

In the exemplary embodiment, in operation, probe cap 300 is positioned such that upstream surface 312 faces the object being measured and/or monitored and downstream surface 310 faces ground conductor 323. As such, when forward propagating electromagnetic field 224 (shown in FIG. 2) is generated by emitter 206, field 224 extends outwardly from emitter body upstream surface 342 and backward propagating field 228 extends outwardly from emitter body downstream surface 340 towards ground conductor 323.

Moreover, during operation, backward propagating electromagnetic field 228 results in electromagnetic radiation (i.e., electromagnetic waves) being emitted within sensor assembly 110. Further, when the loading is induced to emitter 206, the variation in impedance levels between emitter 206, data conduit 204 and signal processing device 200 (shown in FIG. 2) results in extraneous currents that are generated by emitter 206 and/or data conduit 204. More specifically, in the exemplary embodiment, the extraneous currents that are generated by emitter 206 and/or data conduit 204 include at least one common mode current.

In the exemplary embodiment, when backward propagating electromagnetic field 228 is emitted, field 228 is reflected from ground conductor 323 such that backward propagating electromagnetic field 228 interacts with forward propagating electromagnetic field 224. Moreover, the interaction between backward propagating electromagnetic field 228 and forward propagating electromagnetic field 224 is dependent on distance 360. In the exemplary embodiment, the greater the value is for distance 360, the less interaction there is between backward propagating electromagnetic field 228 and forward propagating electromagnetic field 224. More specifically, for example, if distance 360 is substantially equal to a quarter wavelength for the detuned loading signal at an operating frequency of 3.3 GHz, then there is less interaction between backward propagating electromagnetic field 228 and forward propagating electromagnetic field 224. Moreover, in the exemplary embodiment, the interaction enables backward propagating electromagnetic field 228 to be substantially reduced. Moreover, a portion of backward propagating electromagnetic field 228 that is not reflected from ground conductor 323 is absorbed by electromagnetic absorbent material 307 that is applied on ground conductor 323.

As a result, the electromagnetic radiation within sensor assembly 110 (shown in FIG. 2) and/or within probe 202 is substantially reduced. More specifically, in the exemplary embodiment, the strength and amplitude of backward propagating electromagnetic field 228 are substantially reduced. Moreover, in the exemplary embodiment, as backward propagating electromagnetic field 228 is substantially reduced, the strength of the forward propagating electromagnetic field 224 is concentrated within a narrow range. In addition to substantially reducing backward propagating electromagnetic field 228, the common mode current that is generated by emitter 206 and/or data conduit 204 is absorbed by ground conductor 323. Ground conductor 323 transmits the common mode current to ground such that the electromagnetic radiation within sensor assembly and/or within probe 202 is further substantially reduced.

Figure 4:
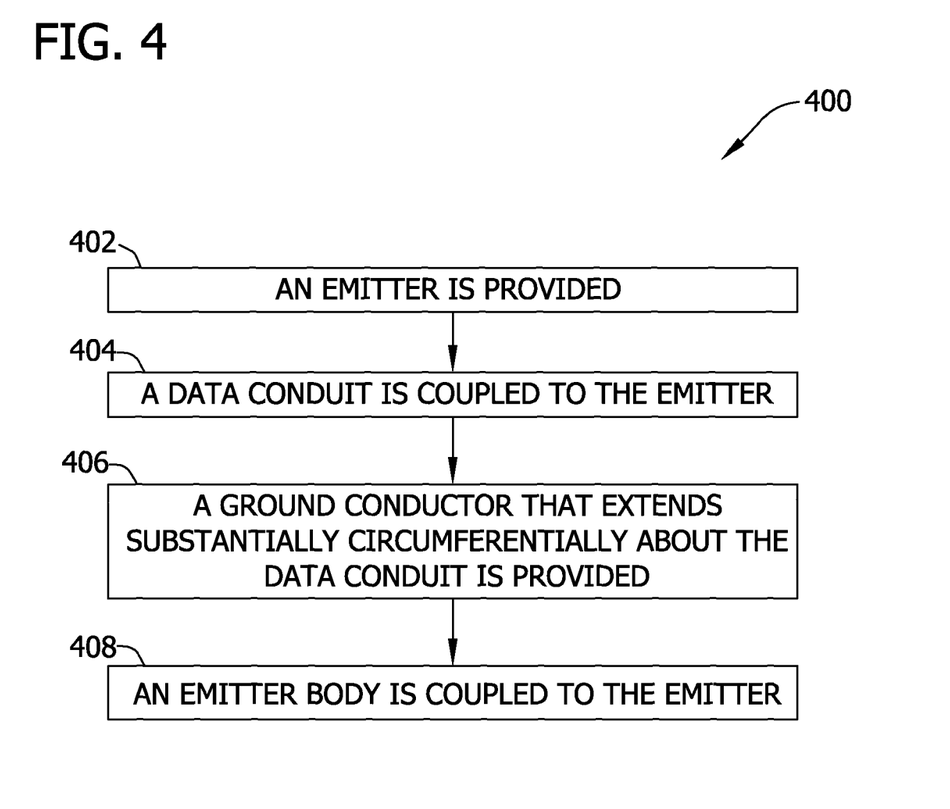
FIG. 4 is a flow diagram of an exemplary method of assembling the sensor probe shown in FIG. 3.

FIG. 4 is a flow diagram illustrating an exemplary method 400 of assembling a sensor probe, such as sensor probe 202 (shown in FIGS. 1 and 2). An emitter 206 (shown in FIG. 2) is provided 402, wherein emitter 206 is configured to generate at least one forward propagating electromagnetic field 224 (shown in FIG. 2) from at least one microwave signal and to generate at least one backward propagating electromagnetic field 228 (shown in FIG. 2). A data conduit 204 (shown in FIGS. 2 and 3) is coupled 404 to emitter 206. A ground conductor 323 (shown in FIG. 3) that extends substantially circumferentially about data conduit 204 is provided 406, wherein ground conductor 323 is configured to substantially reduce electromagnetic radiation within a sensor assembly 110 (shown in FIGS. 1 and 2). Moreover, an emitter body 338 (shown in FIG. 3) is coupled 408 to emitter 206.

As compared to known sensor probes, the exemplary sensor probe described herein facilitates substantially reducing electromagnetic radiation within a sensor assembly in order to maintain a signal strength therein. In particular, the sensor probe described herein is configured such that at least one backward propagating electromagnetic field generated by the emitter is reflected to interact with a forward propagating electromagnetic field generated by the emitter. This interaction facilitates substantially reducing the electromagnetic radiation within the sensor assembly. Moreover, within the sensor assembly described herein, extraneous currents, such as common mode currents generated by the emitter and/or the data conduit, are channeled to ground. Channeling such extraneous currents to ground also facilitates in substantially reducing electromagnetic radiation within sensor assembly.

Exemplary embodiments of a sensor assembly and methods for reducing electromagnetic radiation are described above in detail. The methods and sensor assembly are not limited to the specific embodiments described herein, but rather, components of the sensor assembly and/or steps of the methods may be utilized independently and separately from other components and/or steps described herein. For example, the sensor assembly may also be used in combination with other measuring systems and methods, and is not limited to practice with only the power system as described herein. Rather, the exemplary embodiment can be implemented and utilized in connection with many other measurement and/or monitoring applications.

Although specific features of various embodiments of the invention may be shown in some drawings and not in others, this is for convenience only. In accordance with the principles of the invention, any feature of a drawing may be referenced and/or claimed in combination with any feature of any other drawing.

This written description uses examples to disclose the invention, including the best mode, and also to enable any person skilled in the art to practice the invention, including making and using any devices or systems and performing any incorporated methods. The patentable scope of the invention is defined by the claims, and may include other examples that occur to those skilled in the art. Such other examples are intended to be within the scope of the claims if they have structural elements that do not differ from the literal language of the claims, or if they include equivalent structural elements with insubstantial differences from the literal language of the claims.

What is claimed is:

1. A method of assembling a sensor probe for use in a sensor assembly, comprising:

providing an emitter configured to generate at least one forward propagating electromagnetic field from at least one microwave signal and to generate at least one backward propagating electromagnetic field;

coupling a data conduit to the emitter;

providing a ground conductor that extends substantially circumferentially about the data conduit, wherein the ground conductor is spaced a distance from the emitter; and controlling the distance between the ground conductor and the emitter to be substantially equal to a quarter wavelength of a reflection of the at least one microwave signal to reduce electromagnetic radiation within the sensor assembly.

2. The method in accordance with claim 1, wherein providing a ground conductor further comprises providing a ground conductor that extends substantially circumferentially about the data conduit such that the ground conductor reflects the at least one backward propagating electromagnetic field to interact with the at least one forward propagating electromagnetic field.

3. The method in accordance with claim 1, wherein providing a ground conductor further comprises providing a ground conductor that extends substantially circumferentially about the data conduit in order to channel at least one common mode current to ground, the at least one common mode current is generated by at least one of the emitter and the data conduit.

4. The method in accordance with claim 1, further comprising coupling an emitter body to the emitter, wherein the emitter body includes an electromagnetic absorbent material applied thereon.

5. The method in accordance with claim 1, wherein providing a ground conductor further comprises providing a ground conductor that includes an electromagnetic absorbent material applied thereon.

6. The method in accordance with claim 1, wherein providing a ground conductor further comprises providing a ground conductor fabricated from a metallic material.

7. The method in accordance with claim 1, wherein providing a ground conductor further comprises providing a ground conductor that includes an upstream surface and a downstream surface spaced less than approximately 0.1 inches from the upstream surface.

8. A sensor probe for use in a sensor assembly, comprising:

an emitter configured to generate at least one forward propagating electromagnetic field from at least one microwave signal and to generate at least one backward propagating electromagnetic field;

a data conduit coupled to the emitter; and a ground conductor extending substantially circumferentially about the data conduit, wherein the ground conductor is spaced a distance from the emitter, the distance is substantially equal to a quarter wavelength of a reflection of the at least one microwave signal, and the ground conductor is configured to reduce electromagnetic radiation within the sensor assembly based at least in part on the distance.

9. The sensor probe in accordance with claim 8, wherein the ground conductor is further configured to reflect the at least one backward propagating electromagnetic field to interact with the at least one forward propagating electromagnetic field.

10. The sensor probe in accordance with claim 8, wherein the ground conductor is further configured to channel at least one common mode current to ground, wherein the at least one common mode current is generated by at least one of the emitter and the data conduit.

11. The sensor probe in accordance with claim 8, wherein the at least one backward propagating electromagnetic field interacts with the at least one forward propagating electromagnetic field such that at least one of the strength and the amplitude of the at least one backward propagating electromagnetic field is reduced.

12. The sensor probe in accordance with claim 8, further comprising an emitter body coupled to the emitter, wherein the emitter body comprises an electromagnetic absorbent material applied thereon, and the ground conductor comprises an electromagnetic absorbent material applied thereon.

13. The sensor probe in accordance with claim 8, wherein the ground conductor is fabricated from a metallic material.

14. The sensor probe in accordance with claim 8, comprising:
   a cavity about the data conduit formed by an inner sleeve disposed about the data conduit, a downstream surface of the emitter, and an upstream surface of the ground conductor; and
   an electromagnetic absorbent material layer applied about the cavity to the inner sleeve, the downstream surface of the emitter, and the upstream surface of the ground conductor.

15. The sensor probe in accordance with claim 8, wherein the ground conductor comprises an upstream surface and a downstream surface spaced a predetermined distance from the upstream surface.

16. A sensor assembly comprising:
   at least one sensor probe comprising:
      an emitter configured to generate at least one forward propagating electromagnetic field from at least one microwave signal and to generate at least one backward propagating electromagnetic field;
      a data conduit coupled to the emitter;
      a ground conductor extending substantially circumferentially about the data conduit, the ground conductor configured to reduce electromagnetic radiation within the sensor assembly;
      a probe housing comprising:
         an outer sleeve positioned about the ground conductor; and
         an inner sleeve disposed radially between the outer sleeve and the data conduit, and disposed axially between the emitter and the ground conductor, wherein the inner sleeve is configured to electromagnetically isolate the emitter from the outer sleeve; and
   a signal processing device coupled to the at least one sensor probe, the signal processing device configured to generate a proximity measurement based on a loading induced to the emitter.

17. The sensor assembly in accordance with claim 16, wherein the ground conductor is further configured to reflect the at least one backward propagating electromagnetic field to interact with the at least one forward propagating electromagnetic field.

18. The sensor assembly in accordance with claim 16, wherein the ground conductor is further configured to channel at least one common mode current to ground, wherein the at least one common mode current is generated by at least one of the emitter and the data conduit.

19. The sensor assembly in accordance with claim 16, wherein the sensor probe further comprises an emitter body coupled to the emitter, the emitter body comprises an electromagnetic absorbent material applied thereon.

20. The sensor assembly in accordance with claim 16, wherein the ground conductor comprises an electromagnetic absorbent material applied thereon.

* * * * *